(12) United States Patent
Jeon et al.

(10) Patent No.: US 12,533,718 B2
(45) Date of Patent: Jan. 27, 2026

(54) DEVICE FOR PERFORATING SECONDARY BATTERY AND SYSTEM INCLUDING THE SAME

(71) Applicant: SK ON CO., LTD., Seoul (KR)

(72) Inventors: Soo Yong Jeon, Daejeon (KR); Jeong Hee Yoo, Daejeon (KR); Seung Jun Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 387 days.

(21) Appl. No.: 18/193,378

(22) Filed: Mar. 30, 2023

(65) Prior Publication Data
US 2023/0311179 A1   Oct. 5, 2023

(30) Foreign Application Priority Data
Mar. 31, 2022   (KR) .......................... 10-2022-0040278

(51) Int. Cl.
*B09B 3/35* (2022.01)
*B09B 101/16* (2022.01)

(52) U.S. Cl.
CPC .............. *B09B 3/35* (2022.01); *B09B 2101/16* (2022.01)

(58) Field of Classification Search
CPC .......................................................... B09B 3/35
See application file for complete search history.

(56) References Cited

U.S. PATENT DOCUMENTS

| | | | | |
|---|---|---|---|---|
| 3,623,540 A | * | 11/1971 | Goodwin | H01M 4/73 83/903 |
| 3,624,819 A | * | 11/1971 | Schickling | B23Q 1/032 408/19 |
| 3,631,753 A | * | 1/1972 | Hall | B21D 28/04 83/648 |
| 3,779,118 A | * | 12/1973 | Habanec | B26D 7/0675 83/648 |
| 3,949,630 A | * | 4/1976 | Winkel | B23D 31/04 83/903 |

(Continued)

FOREIGN PATENT DOCUMENTS

| | | |
|---|---|---|
| CN | 105958149 A | 9/2016 |
| CN | 206296485 U | 7/2017 |

(Continued)

OTHER PUBLICATIONS

Extended European Search Report for the European Patent Application No. 23165969.9 issued by the European Patent Office on Jun. 4, 2024.

(Continued)

*Primary Examiner* — Omar Flores Sanchez
(74) *Attorney, Agent, or Firm* — IP & T GROUP LLP

(57) ABSTRACT

A perforation device is disclosed. The perforation device perforating a battery module includes a loading unit configured to convey and load the battery module in a longitudinal direction, a fixing unit configured to fix the battery module, and a perforation unit configured to approach the battery module and perforate the battery module. When the perforation unit approaches the battery module, the fixing unit contacts the battery module on an opposite side of the perforation unit with respect to the battery module and suppresses a movement of the battery module.

20 Claims, 13 Drawing Sheets

(56) References Cited

U.S. PATENT DOCUMENTS

| | | | | |
|---|---|---|---|---|
| 4,683,022 | A | * | 7/1987 | Watanabe ............ B65H 19/105 156/934 |
| 4,821,971 | A | * | 4/1989 | Watanabe ............... B65H 16/00 242/562 |
| 5,114,043 | A | * | 5/1992 | Collins, Jr. ............... B09B 3/00 414/412 |
| 6,227,088 | B1 | * | 5/2001 | Cestonaro ............ B65H 19/105 83/563 |
| 6,481,470 | B1 | * | 11/2002 | Rubenic .................... B09B 3/00 222/5 |
| 12,327,848 | B1 | * | 6/2025 | Sun ............................ B09B 3/35 |
| 2007/0147776 | A1 | * | 6/2007 | Ito .............................. B09B 3/35 386/254 |
| 2008/0061177 | A1 | * | 3/2008 | Ito .............................. B09B 5/00 241/285.1 |
| 2008/0250948 | A1 | * | 10/2008 | Aoki ......................... B26F 1/24 100/282 |
| 2011/0045656 | A1 | * | 2/2011 | Lim ..................... B28D 5/0094 83/648 |
| 2014/0170923 | A1 | * | 6/2014 | Sanglier .................... B09B 3/35 445/2 |
| 2024/0033791 | A1 | * | 2/2024 | Kim ........................... B09B 3/35 |
| 2025/0158258 | A1 | * | 5/2025 | Troutt ....................... A62C 3/07 |
| 2025/0187019 | A1 | * | 6/2025 | Alexandroff ............ B02C 23/14 |

FOREIGN PATENT DOCUMENTS

| | | |
|---|---|---|
| CN | 207781839 U | 8/2018 |
| CN | 111112991 B | 1/2022 |
| CN | 215709715 U | 2/2022 |
| CN | 112599880 B | 3/2022 |
| KR | 10-2000-0042144 A | 7/2000 |
| KR | 10-2006-0105206 A | 10/2006 |
| KR | 10-0796376 B1 | 1/2008 |
| KR | 10-2011-0070454 A | 6/2011 |
| KR | 10-1078580 B1 | 11/2011 |
| KR | 10-1412467 B1 | 7/2014 |
| KR | 10-2024688 B1 | 9/2019 |
| KR | 10-2191858 B1 | 12/2020 |
| KR | 10-2317034 B1 | 10/2021 |

OTHER PUBLICATIONS

Office Action for Chinese Patent Application No. 202310277540.3 issued by the Chinese Patent Office on Jul. 29, 2025.

* cited by examiner

DEVICE FOR PERFORATING SECONDARY BATTERY AND SYSTEM INCLUDING THE SAME

CROSS-REFERENCE TO RELATED APPLICATIONS

This application claims the priority benefit of Korean Patent Application No. 10-2022-0040278 filed on Mar. 31, 2022, which is incorporated herein by reference for all purposes as if fully set forth herein.

TECHNICAL FIELD

The present disclosure relates to a perforation device and a perforation system including the same. More particularly, the present disclosure relates to a perforation device for perforating a secondary battery and a perforation system including the same.

BACKGROUND

A secondary battery has energy therein. Therefore, it is necessary to stably discard secondary batteries that have reached the end of their life or are damaged. Conventional secondary batteries were subjected to a chemical immersion discharge in which they are broken and immersed in water. In particular, in case of a pouch-type secondary battery, a pouch of the secondary battery was cut before immersing the secondary battery.

When the pouch of the secondary battery is cut, it is difficult to determine whether or not the cut is made and the size of the cut, so the secondary battery may not be discharged. In this case, a thermal runaway accident may occur in the secondary battery. Therefore, a method may be considered to stably discard the secondary battery, that has reached the end of its life or is damaged, by stably perforating the secondary battery.

(Patent Document 1) KR 10-2000-0042144 A

SUMMARY

An object of the present disclosure is to address the above-described and other problems.

Another object of the present disclosure is to provide a perforation device perforating a battery module by changing a perforation position depending on a size or a structure of the battery module, and a perforation system including the same.

Another object of the present disclosure is to provide a perforation device, in which a position fixing a battery module changes depending on a position of a perforation unit perforating the battery module, and a perforation system including the same.

Another object of the present disclosure is to provide a perforation system including a guide device conveying and aligning a battery module and a perforation device perforating the battery module.

In order to achieve the above-described and other objects and needs, in one aspect of the present disclosure, there is provided a perforation device perforating a battery module, the perforation device comprising a loading unit configured to convey and load the battery module in a longitudinal direction; a fixing unit configured to fix the battery module; and a perforation unit configured to approach the battery module and perforate the battery module, wherein when the perforation unit approaches the battery module, the fixing unit contacts the battery module on an opposite side of the perforation unit with respect to the battery module and suppresses a movement of the battery module.

In another aspect of the present disclosure, there is provided a perforation system comprising a guide device configured to convey and align a battery module; and a perforation device configured to perforate the battery module, wherein the guide device includes a guide frame; a first conveying unit installed in the guide frame, the first conveying unit being configured to convey the battery module and provide the battery module to the perforation device; and an alignment unit configured to align the battery module, wherein the perforation device includes a loading unit configured to convey and load the battery module in a longitudinal direction; a fixing unit configured to fix the battery module; and a perforation unit configured to approach the battery module and perforate the battery module.

Effects of the perforation device and the perforation system including the same according to the present disclosure are described as follows.

According to at least one aspect of the present disclosure, the present disclosure can provide a perforation device perforating a battery module by changing a perforation position depending on a size or a structure of the battery module, and a perforation system including the same.

According to at least one aspect of the present disclosure, the present disclosure can provide a perforation device, in which a position fixing a battery module changes depending on a position of a perforation unit perforating the battery module, and a perforation system including the same.

According to at least one aspect of the present disclosure, the present disclosure can provide a perforation system including a guide device conveying and aligning a battery module and a perforation device perforating the battery module.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Figure 1:
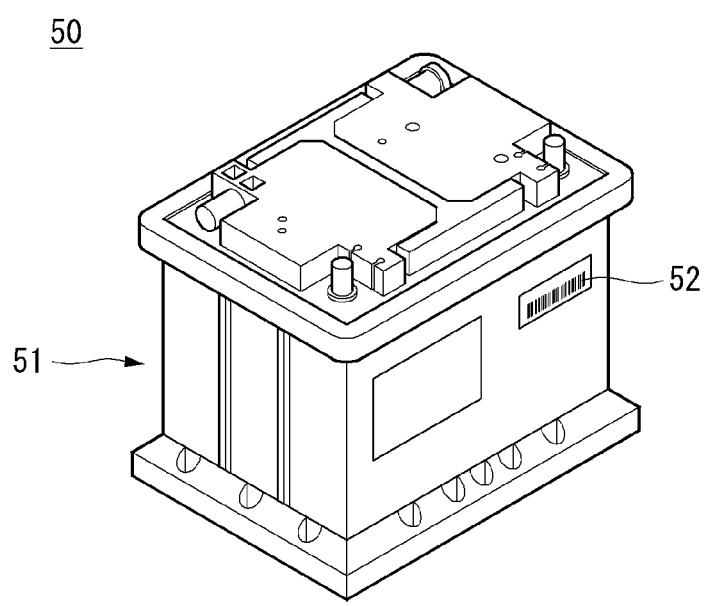
FIG. 1 illustrates a battery module.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

FIG. 1 illustrates a battery module.

Referring to FIG. 1, a battery module 50 may include a battery body 51. The battery body 51 may include a plurality of battery cells. For example, the battery body 51 may include a plurality of battery cells and a battery case accommodating the plurality of battery cells.

The battery module 50 may include a battery tag 52. The battery tag 52 may be formed on an outer surface of the battery body 51. For example, the battery tag 52 may be a sticker attached to the outer surface of the battery body 51.

The battery tag 52 may include information on the battery module 50. For example, the battery tag 52 may display a brand including information about a manufacturer of the battery module 50. For example, the battery tag 52 may display a serial number including specification information of the battery module 50. For example, the battery tag 52 may display a bar-code or QR-code including information on the battery module 50.

Information on the battery module 50 that can be known from the battery tag 52 may include the size of the battery module 50. Information on the battery module 50 that can be known from the battery tag 52 may include at least one of a manufacturing year, a charging method, and an electrode material of the battery module 50.

Figure 2:
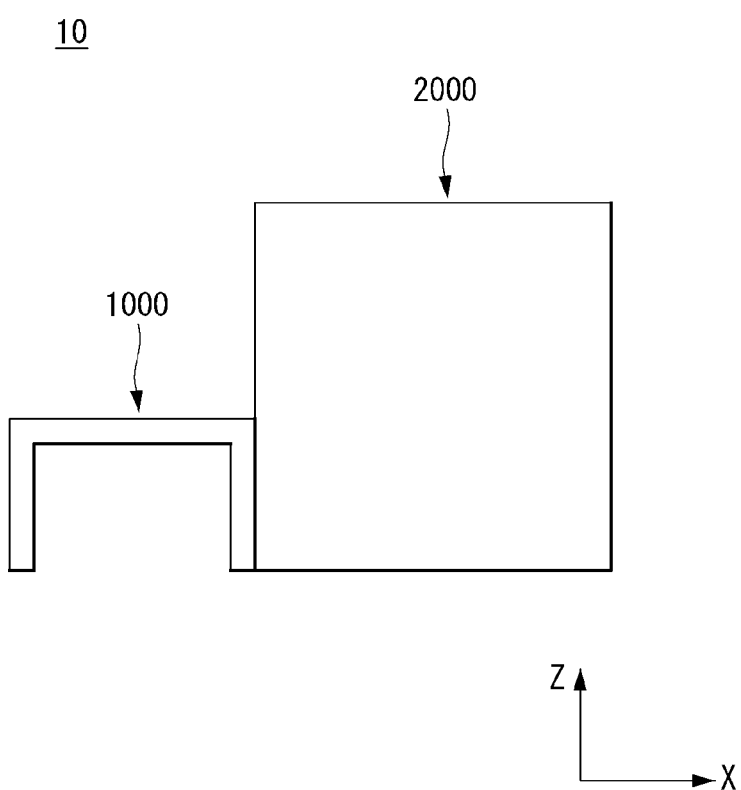
FIG. 2 illustrates a perforation system according to an embodiment of the present disclosure when viewed from its side.
Figure 3:
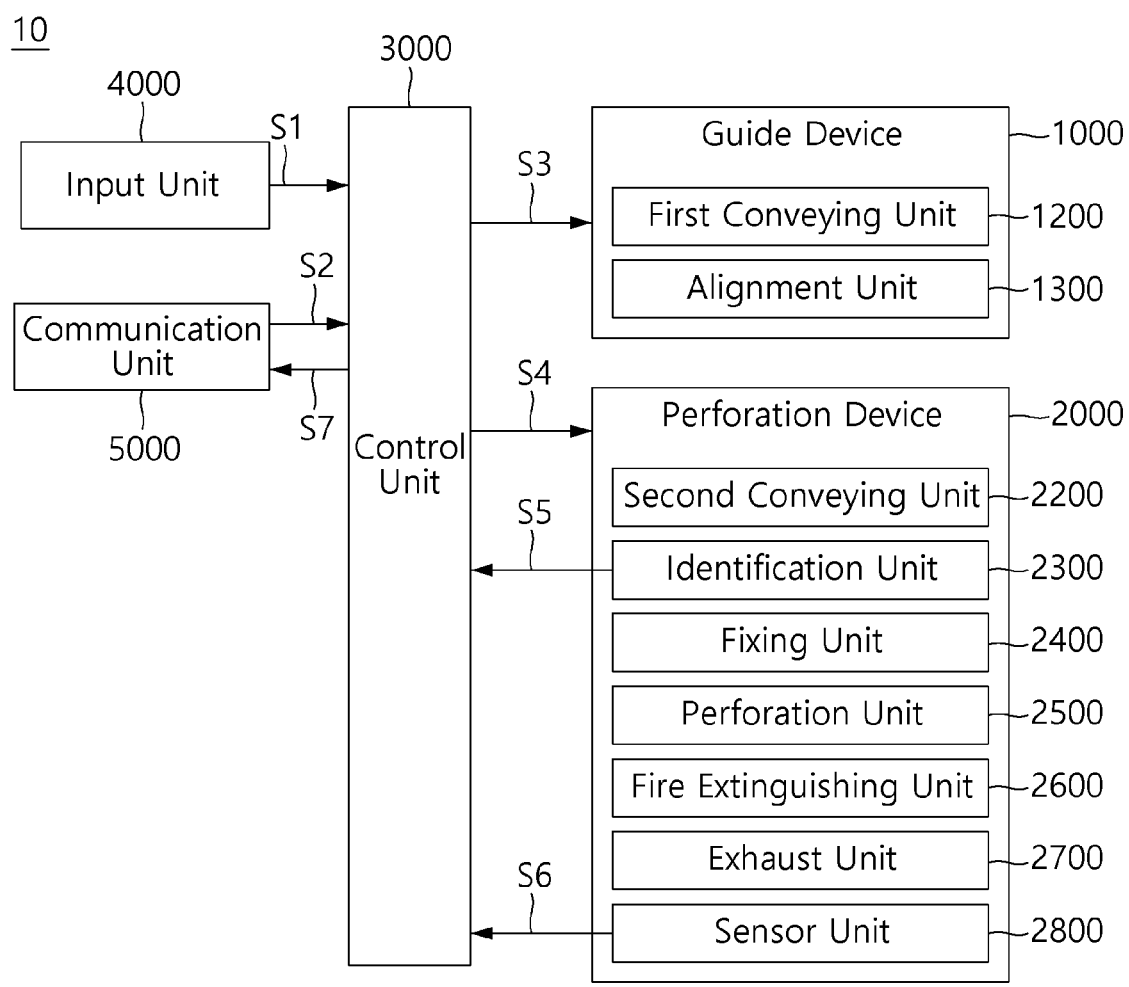
FIG. 3 is a block diagram of a perforation system according to an embodiment of the present disclosure.

FIG. 2 illustrates a perforation system 10 according to an embodiment of the present disclosure when viewed from its side. FIG. 3 is a block diagram of the perforation system 10 according to an embodiment of the present disclosure.

Referring to FIGS. 1 to 3, the perforation system 10 may include a guide device 1000. The guide device 1000 may operate based on a received signal. For example, the guide device 1000 may operate based on a third signal S3.

The guide device 1000 may convey the battery module 50. For example, the guide device 1000 may include a first conveying unit 1200. The first conveying unit 1200 may convey the battery module 50. The battery module 50 conveyed by the first conveying unit 1200 may be the battery module 50 to be discarded.

The guide device 1000 may align the battery module 50. For example, the guide device 1000 may include an alignment unit 1300. The alignment unit 1300 may align the battery modules 50.

The perforation system 10 may include a perforation device 2000. The perforation device 2000 may operate based on a signal. For example, the perforation device 2000 may operate based on a fourth signal S4.

The perforation device 2000 may receive the battery module 50 from the guide device 1000. The perforation device 2000 may perforate the battery module 50. The electrical stability of the perforated battery module 50 may be higher than the electrical stability of the non-perforated battery module 50.

The perforation device 2000 may include a second conveying unit 2200. The second conveying unit 2200 may load the battery module 50. The second conveying unit 2200 may move the battery module 50.

The perforation device 2000 may include an identification unit 2300. The identification unit 2300 may identify the battery module 50. For example, the identification unit 2300 may include a camera. The camera of the identification unit 2300 may obtain an image of the battery tag 52.

For another example, the camera of the identification unit 2300 may obtain an image of the battery module 50. The image of the battery module 50 may include information on the size of the battery module 50. For example, the identification unit 2300 or a control unit 3000 may analyze the image of the battery module 50 to acquire size information of the battery module 50.

The identification unit 2300 may generate a signal. For example, the identification unit 2300 may generate a fifth signal S5. For example, the fifth signal S5 may include image information on the battery module 50 acquired by the identification unit 2300. For another example, the fifth signal S5 may include image information on the battery tag 52 acquired by the identification unit 2300. The fifth signal S5 may be transmitted to the control unit 3000.

The perforation device 2000 may include a fixing unit 2400. The fixing unit 2400 may fix the battery module 50. For example, the fixing unit 2400 may fix the battery module 50 in at least one of a front-rear direction, an up-down direction, and a left-right direction of the battery module 50.

The front-rear direction, the up-down direction, and the left-right direction of the battery module 50 may mean a front-rear direction, an up-down direction, and a left-right direction of the perforation device 2000. The front-rear direction may be a "longitudinal direction". The up-down direction may be a "vertical direction". The left-right direction may be a "transverse direction". In the cartesian coordinate, the longitudinal direction may be parallel to an X-axis, the transverse direction may be parallel to a Y-axis, and the vertical direction may be parallel to a Z-axis.

The perforation device 2000 may include a perforation unit 2500. The perforation unit 2500 may perforate the battery module 50. The perforation unit 2500 may include a drill. The perforated battery module 50 has the possibility of burning by a chemical reaction. Alternatively, in a process of perforating the battery module 50, there is a possibility that a fire may occur in the battery module 50.

The perforation device 2000 may include a fire extinguishing unit 2600 and an exhaust unit 2700. When a fire occurs in the battery module 50, the fire extinguishing unit 2600 extinguishes the fire, and the exhaust unit 2700 exhausts smoke generated during the fire to the outside. The exhaust unit 2700 may discharge dust or chemicals generated in the process of perforating the battery module 50 to the outside.

The perforation device 2000 may include a sensor unit 2800. The sensor unit 2800 may detect a position and an attitude of the battery module 50. Information about the sensed position and attitude of the battery module 50 may be used to control at least one of the second conveying unit 2200, the fixing unit 2400, and the perforation unit 2500.

The sensor unit 2800 may include a smoke sensor that detects smoke. The sensor unit 2800 may include a flame detection sensor that detects a flame. Information on the detected smoke or/and flame may be used to control the fire extinguishing unit 2600 and the exhaust unit 2700.

The sensor unit 2800 may generate a signal. For example, the sensor unit 2800 may generate a sixth signal S6. The sixth signal S6 may include information about the position and the attitude of the battery module 50. The sixth signal S6 may include information about smoke or/and flame. The sixth signal S6 may be transmitted to the control unit 3000.

The perforation system 10 may include the control unit 3000. The control unit 3000 may process signals or information. The control unit 3000 may process calculations. The control unit 3000 may be implemented by at least one of a computer, a laptop, a processor, a server, and a printed circuit board (PCB).

The perforation system 10 may include an input unit 4000. The input unit 4000 may obtain a command input by, for example, a user or an administrator. The command obtained by the input unit 4000 may include information related to control of the guide device 1000 or/and the perforation device 2000.

The input unit 4000 may generate a signal. For example, the input unit 4000 may generate a first signal S1. The first signal S1 may include information related to control of the guide device 1000 or/and the perforation device 2000.

The perforation system 10 may include a communication unit 5000. The communication unit 5000 may transmit and receive signals or/and information with an external device. The communication unit 5000 may generate or receive a signal. The communication unit 5000 may transmit and receive signals or/and information with the external device in a wired or/and wireless manner.

For example, the communication unit 5000 may generate a second signal S2 and transmit the second signal S2 to the control unit 3000. The communication unit 5000 may receive a seventh signal S7 from the control unit 3000. The second signal S2 may include information related to the control of the perforation system 10. The seventh signal S7 may include information about a state of the perforation system 10.

The control unit 3000 may transmit and receive signals. For example, the control unit 3000 may generate a new signal based on the received signal. For example, the control unit 3000 may generate the output signals S3, S4 and S7 based on the input signals S1, S2, S5 and S6. The input signals S1, S2, S5 and S6 may be signals to be received by the control unit 3000. The output signals S3, S4 and S7 may be signals generated by the control unit 3000.

The input signals S1, S2, S5 and S6 may include at least one of the first signal S1, the second signal S2, the fifth signal S5, and the sixth signal S6. The output signals S3, S4 and S7 may include at least one of the third signal S3, the fourth signal S4, and the seventh signal S7.

The third signal S3 may include information related to the control of the guide device 2000. For example, the first conveying unit 1200 may convey the battery module 50 based on the third signal S3. For example, the alignment unit 1300 may align the battery module 50 based on the third signal S3.

The fourth signal S4 may include information related to the control of the perforation device 3000. For example, the second conveying unit 2200 may move the battery module 50 based on the fourth signal S4.

For example, the fixing unit 2400 may adjust the position and/or attitude of the battery module 50 based on the fourth signal S4. For example, the fixing unit 2400 may fix the battery module 50 based on the fourth signal S4.

For example, the perforation unit 2500 may perforate the battery module 50 based on the fourth signal S4. For example, the fourth signal S4 may include information on a perforation position of the battery module 50.

For example, the fire extinguishing unit 2600 and the exhaust unit 2700 may operate based on the fourth signal S4. For example, the fire extinguishing unit 2600 may inject a fire extinguishing agent toward a fire point based on the fourth signal S4.

Figure 4:
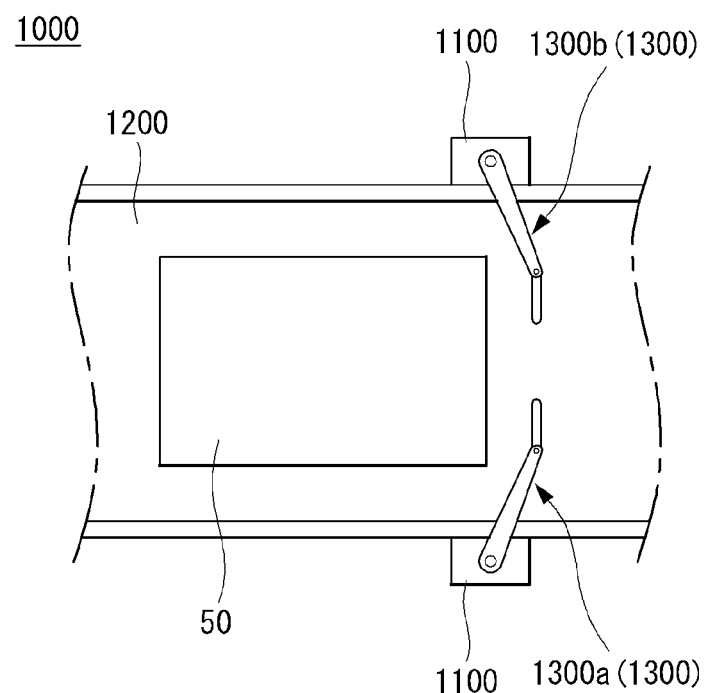
FIG. 4 illustrates a guide device according to an embodiment of the present disclosure.

FIG. 4 illustrates the guide device 1000 according to an embodiment of the present disclosure. In FIG. 4, the guide device 1000 may be observed when viewed from the above.

Referring to FIG. 4, the guide device 1000 may include a guide frame 1100. The guide frame 1100 may be installed or fixed on the ground. The first conveying unit 1200 may be coupled to or installed on the guide frame 1100.

The first conveying unit 1200 may include a conveyor. The first conveying unit 1200 may convey the battery module 50. For example, the first conveying unit 1200 may move the battery module 50 along a longitudinal direction (X).

The guide device 1000 may include the alignment unit 1300. The alignment unit 1300 may be coupled or connected to the guide frame 1100. For example, the alignment unit 1300 may be rotatably coupled to the guide frame 1100.

The plurality of alignment units 1300 may be provided. For example, the alignment unit 1300 may include a first alignment unit 1300a and a second alignment unit 1300b. The alignment unit 1300 may be positioned on the first conveying unit 1200. The alignment unit 1300 may align the battery module 50 on the first conveying unit 1200.

Figure 5:
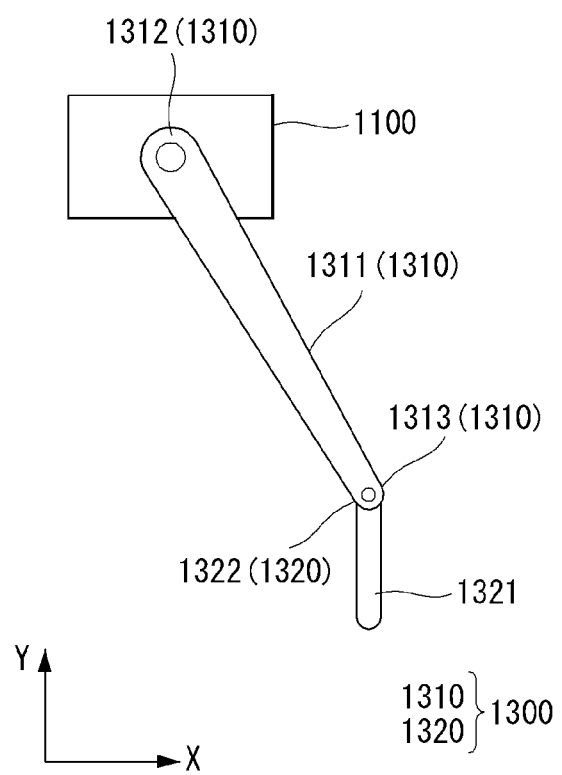
FIG. 5 illustrates that an alignment unit according to an embodiment of the present disclosure is installed on a guide frame.

FIG. 5 illustrates that the alignment unit 1300 according to an embodiment of the present disclosure is installed on the guide frame 1100.

Referring to FIG. 5, the alignment unit 1300 may include a first link 1310. The first link 1310 may include a first link body 1311. The first link body 1311 may form a shape that extends from one end and leads to other end.

The first link 1310 may include a first link pivot part 1312. The first link pivot part 1312 may be formed at the one end of the first link body 1311. The first link pivot part 1312 may be rotatably coupled to the guide frame 1100.

The first link 1310 may include a first link connection part 1313. The first link connection part 1313 may be formed at the other end of the first link body 1311. The first link connection part 1313 may be coupled to a second link 1320.

The alignment unit 1300 may include the second link 1320. The second link 1320 may include a second link body 1321. The second link body 1321 may form a shape that extends from one end and leads to other end.

The second link 1320 may include a second link connection part 1322. The second link connection part 1322 may be formed at the one end of the second link body 1321. The second link connection part 1322 may be coupled to the first link connection part 1313. For example, the second link connection part 1322 may be rotatably coupled to the first link connection part 1313.

Figure 6:
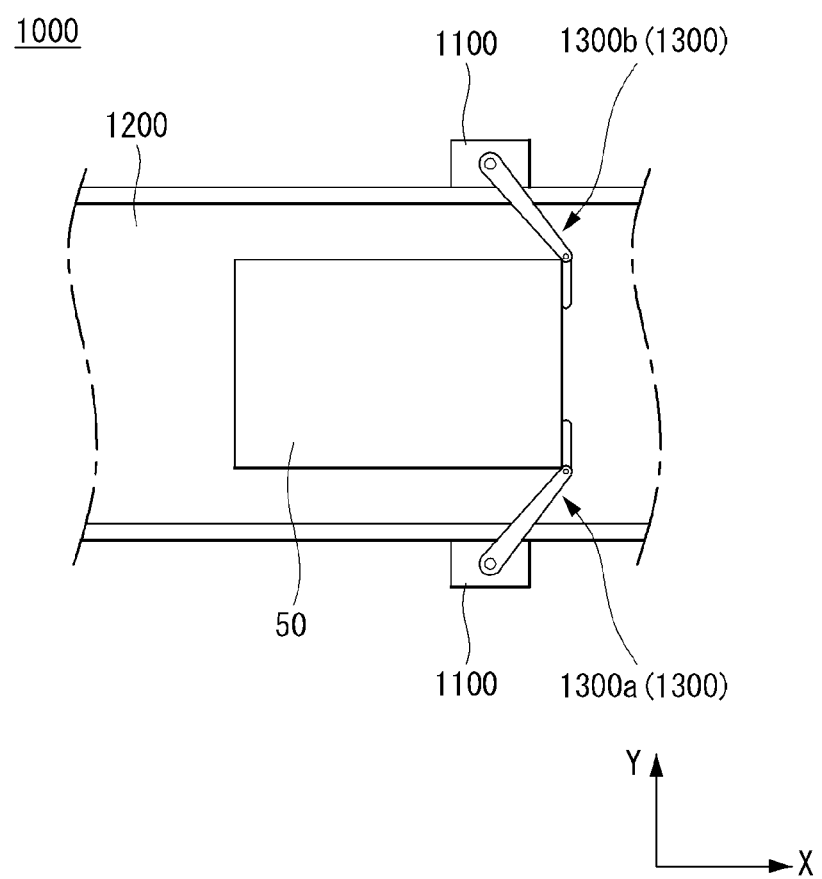
FIG. 6 illustrates that an alignment unit according to an embodiment of the present disclosure aligns a battery module.

FIG. 6 illustrates that the alignment unit 1300 according to an embodiment of the present disclosure aligns the battery module 50.

Referring to FIGS. 4 to 6, the battery module 50 illustrated in FIG. 4 may move in the longitudinal direction (X), and the alignment unit 1300 may align the battery module 50 by contacting the battery module 50 and applying a force to the battery module 50 as illustrated in FIG. 6.

When the battery module 50 moves in the longitudinal direction (X) by the first conveying unit 1200, the battery module 50 may contact the first link 1310. A length direction of the first link body 1311 may form an inclination with the longitudinal direction (X). When the battery module 50 further moves in the longitudinal direction (X), the battery module 50 may push the first link body 1311 in the longitudinal direction (X).

By a force of the battery module 50 pushing the first link body 1311 and a torque applied to the battery module 50 by the first link 1310, the battery module 50 may move along the first link body 1311.

The second link body 1321 may form a torque with respect to the first link body 1311.

A front face of the battery module 50 may face and come into contact with the second link body 1321 of the first alignment unit 1300a and the second link body 1321 of the second alignment unit 1300b.

Hence, the battery module 50 may be aligned in an attitude in which the front face of the battery module 50 is directed toward the longitudinal direction (X) to the front. The front face of the battery module 50 may indicate a face directed toward the longitudinal direction (X).

When the battery module 50 is aligned, the first link body 1311 may rotate in a direction in which the battery module 50 moves. In other words, when the battery module 50 is aligned, the first link body 1311 may rotate about the first link pivot part 1312 so that the second link 1320 is positioned outside the first conveying unit 1200. Thus, the battery module 50 in an aligned state may be provided to the perforation device 2000 (see FIGS. 2 and 3).

Figure 7:
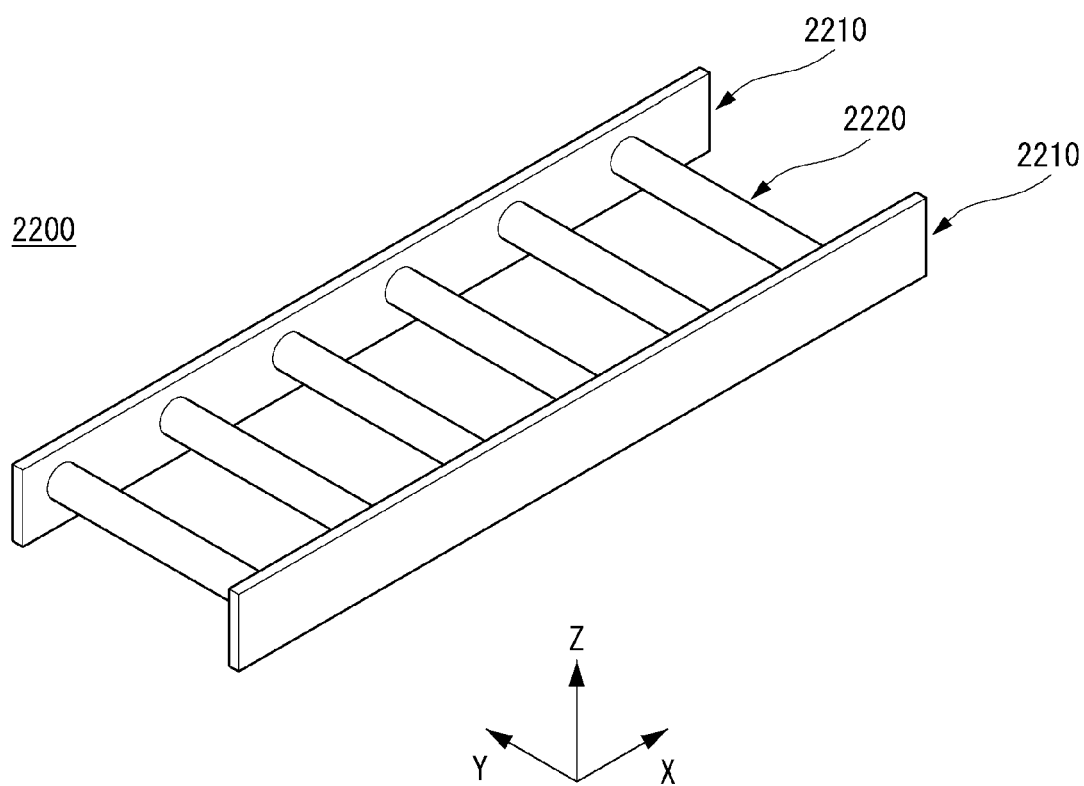
FIG. 7 illustrates a second conveying unit according to an embodiment of the present disclosure.

FIG. 7 illustrates the second conveying unit 2200 according to an embodiment of the present disclosure.

Referring to FIG. 7, the second conveying unit 2200 may include a roller conveyor. The second conveying unit 2200 may load the battery module 50 (see FIG. 1). The second conveying unit 2200 may be referred to as a "loading unit". The second conveying unit 2200 may move the battery module 50 (see FIG. 1) in the longitudinal direction (X).

The second conveying unit 2200 may include a pair of second conveying frames 2210. The pair of second conveying frames 2210 may form a shape extending in the longitudinal direction (X). The second conveying frame 2210 may be referred to as a "loading frame".

The second conveying unit 2200 may include a second conveying roller 2220. A plurality of second conveying rollers 2220 may be provided. The second conveying rollers 2220 may be coupled between the pair of conveying frames 2210. The second conveying roller 2220 may be referred to as a "loading bar". The second conveying roller 2220 may form a cylindrical shape in which a transverse direction (Y) is a length direction.

Figure 8:
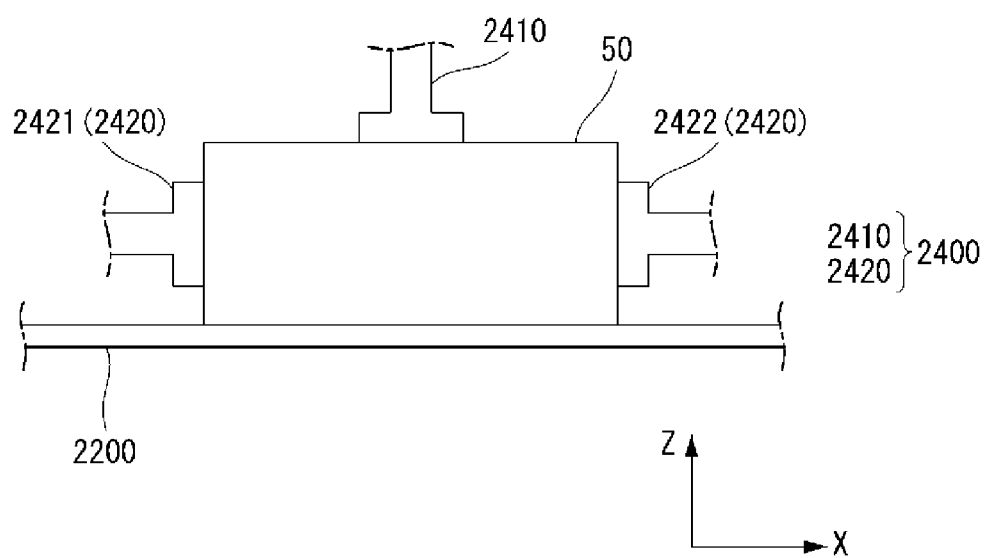
FIG. 8 illustrates that a fixing unit according to an embodiment of the present disclosure fixes a battery module along a longitudinal direction.

FIG. 8 illustrates that the fixing unit 2400 according to an embodiment of the present disclosure fixes the battery module 50 along the longitudinal direction (X). In FIG. 8, the fixing unit 2400 when viewed from the transverse direction may be observed.

Referring to FIG. 8, the fixing unit 2400 may include a vertical fixing module 2410. The vertical fixing module 2410 may approach the battery module 50 from above the battery module 50. The vertical fixing module 2410 may come into contact with an upper surface of the battery module 50. The vertical fixing module 2410 may provide a downward pressure to the battery module 50. The vertical fixing module 2410 may suppress a vertical direction movement of the battery module 50.

The fixing unit 2400 may include a longitudinal fixing module 2420. The longitudinal fixing module 2420 may approach the front face or/and rear face of the battery module 50. The longitudinal fixing module 2420 may contact the front face or/and rear face of the battery module 50. The longitudinal fixing module 2420 may provide a longitudinal pressure to the battery module 50. The longitudinal fixing module 2420 may suppress a longitudinal movement of the battery module 50.

The longitudinal fixing module 2420 may include a first longitudinal fixing module 2421 and a second longitudinal fixing module 2422. The first longitudinal fixing module 2421 may approach the battery module 50 from behind the battery module 50. The first longitudinal fixing module 2421 may contact the rear face of the battery module 50 and provide a pressure to the battery module 50. The second longitudinal fixing module 2422 may approach the battery module 50 from the front of the battery module 50. The second longitudinal fixing module 2422 may contact the front face of the battery module 50 and provide a pressure to the battery module 50

Figure 9:
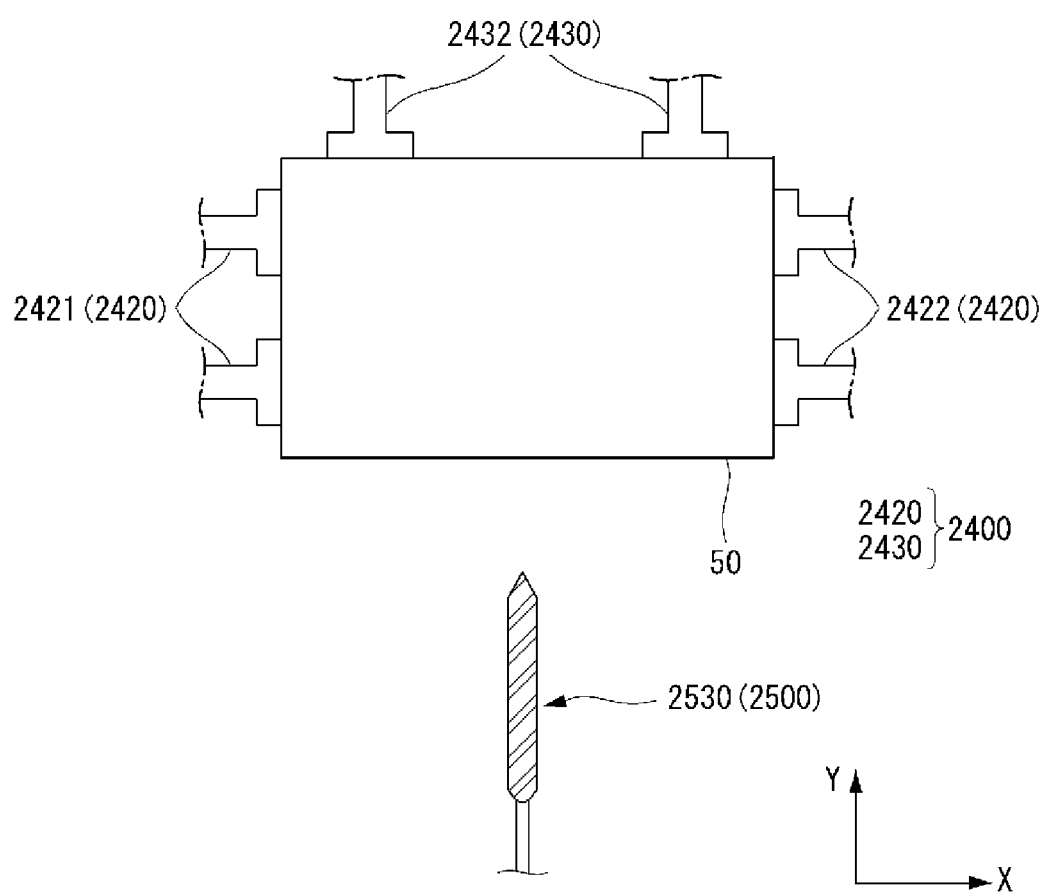
FIG. 9 illustrates that a perforation device according to an embodiment of the present disclosure perforates a battery module in a transverse direction.

FIG. 9 illustrates that the perforation device 2000 according to an embodiment of the present disclosure perforates the battery module 50 in the transverse direction (Y). In FIG. 9, the fixing unit 2400 and the perforation unit 2500 when viewed from above may be observed.

Referring to FIGS. 8 and 9, a plurality of first longitudinal fixing modules 2421 may be provided. The plurality of first longitudinal fixing modules 2421 may be disposed to be spaced apart from each other in the transverse direction (Y) or a vertical direction (Z). For example, the first longitudinal fixing modules 2421 may include a pair of first longitudinal fixing modules 2421.

A plurality of second longitudinal fixing modules 2422 may be provided. The plurality of second longitudinal fixing modules 2422 may be disposed to be spaced apart from each other in the transverse direction (Y) or the vertical direction (Z). For example, the second longitudinal fixing modules 2422 may include a pair of second longitudinal fixing modules 2422.

The fixing unit 2400 may include a transverse fixing module 2430. The transverse fixing module 2430 may suppress a transverse movement of the battery module 50.

The transverse fixing module 2430 may include a second transverse fixing module 2432. The second transverse fixing module 2432 may suppress a positive Y-axis movement of the battery module 50.

A plurality of second transverse fixing modules 2432 may be provided. For example, the second transverse fixing modules 2432 may include a pair of second transverse fixing modules 2432. The pair of second transverse fixing modules 2432 may be disposed to be spaced apart from each other in the transverse direction (Y) or the vertical direction (Z).

The perforation unit 2500 may include a transverse perforation module 2530. The transverse perforation module 2530 may be positioned opposite the transverse fixing module 2430. For example, the transverse perforation module 2530 may be positioned opposite the second transverse fixing modules 2432. The second transverse fixing modules 2432, the battery module 50, and the transverse perforation module 2530 may be sequentially disposed.

The transverse perforation module 2530 may approach the battery module 50. The transverse perforation module 2530 may move toward, for example, between the pair of second transverse fixing modules 2432. The transverse perforation module 2530 may perforate the battery module 50.

In a process in which the transverse perforation module 2530 perforates the battery module 50, the transverse perforation module 2530 may push the battery module 50 in a direction in which the transverse perforation module 2530 moves. The transverse fixing module 2430 may suppress the battery module 50 from moving in the transverse direction (Y).

Figure 10:
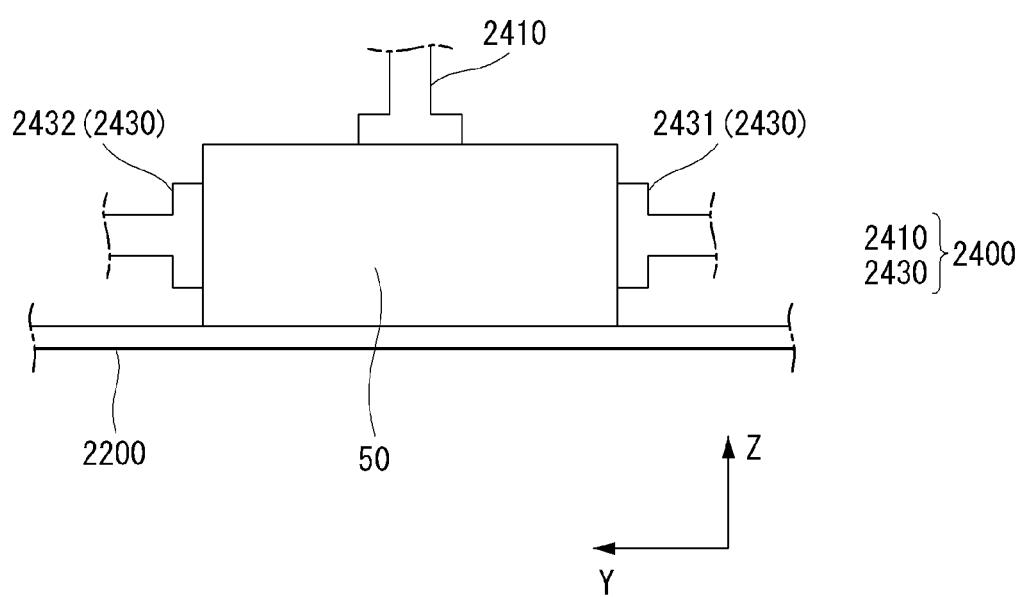
FIG. 10 illustrates that a fixing unit according to an embodiment of the present disclosure fixes a battery module along a transverse direction.

FIG. 10 illustrates that the fixing unit 2400 according to an embodiment of the present disclosure fixes the battery module 50 along the transverse direction (Y). In FIG. 10, the fixing unit 2400 when viewed from the longitudinal direction may be observed.

Referring to FIG. 10, the transverse fixing module 2430 may include a first transverse fixing module 2431 and the second transverse fixing module 2432. The first transverse fixing module 2431 and the second transverse fixing module 2432 may be disposed with the battery module 50 interposed therebetween. The first transverse fixing module 2431 and the second transverse fixing module 2432 may approach the battery module 50 and contact the battery module 50. The first transverse fixing module 2431 and the second transverse fixing module 2432 may suppress the battery module 50 from moving in the transverse direction (Y).

Figure 11:
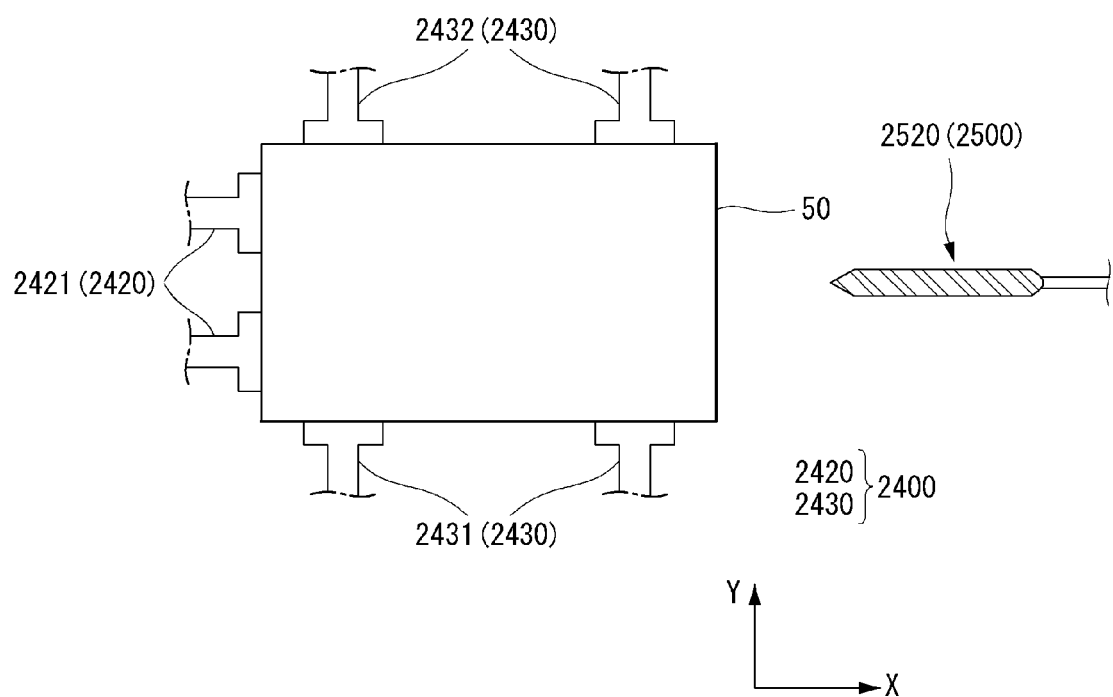
FIG. 11 illustrates that a perforation device according to an embodiment of the present disclosure perforates a battery module in a longitudinal direction.

FIG. 11 illustrates that the perforation device 2000 according to an embodiment of the present disclosure perforates the battery module 50 in the longitudinal direction (X). In FIG. 11, the fixing unit 2400 and the perforation unit 2500 when viewed from above may be observed.

Referring to FIGS. 10 and 11, a plurality of first transverse fixing modules 2431 may be provided. The plurality of first transverse fixing modules 2431 may be disposed to be spaced apart from each other in the longitudinal direction (X) or the vertical direction (Z). For example, the first transverse fixing modules 2431 may include a pair of first transverse fixing modules 2431.

The plurality of second transverse fixing modules 2432 may be provided. The plurality of second transverse fixing modules 2432 may be disposed to be spaced apart from each other in the longitudinal direction (X) or the vertical direction (Z). For example, the second transverse fixing modules 2432 may include a pair of second transverse fixing modules 2432.

The perforation unit 2500 may include a longitudinal perforation module 2520. The longitudinal perforation module 2520 may be positioned opposite the longitudinal fixing module 2420. For example, the longitudinal perforation module 2520 may be positioned opposite the first longitudinal fixing modules 2421. The first longitudinal fixing modules 2421, the battery module 50, and the longitudinal perforation module 2520 may be sequentially disposed.

The longitudinal perforation module 2520 may approach the battery module 50. The longitudinal perforation module 2520 may move toward, for example, between the pair of first longitudinal fixing modules 2421. The longitudinal perforation module 2520 may perforate the battery module 50.

In a process in which the longitudinal perforation module 2520 perforates the battery module 50, the longitudinal perforation module 2520 may push the battery module 50 in a direction in which the longitudinal perforation module 2520 moves. The longitudinal fixing module 2420 may suppress the battery module 50 from moving in the longitudinal direction (X).

Figure 12:
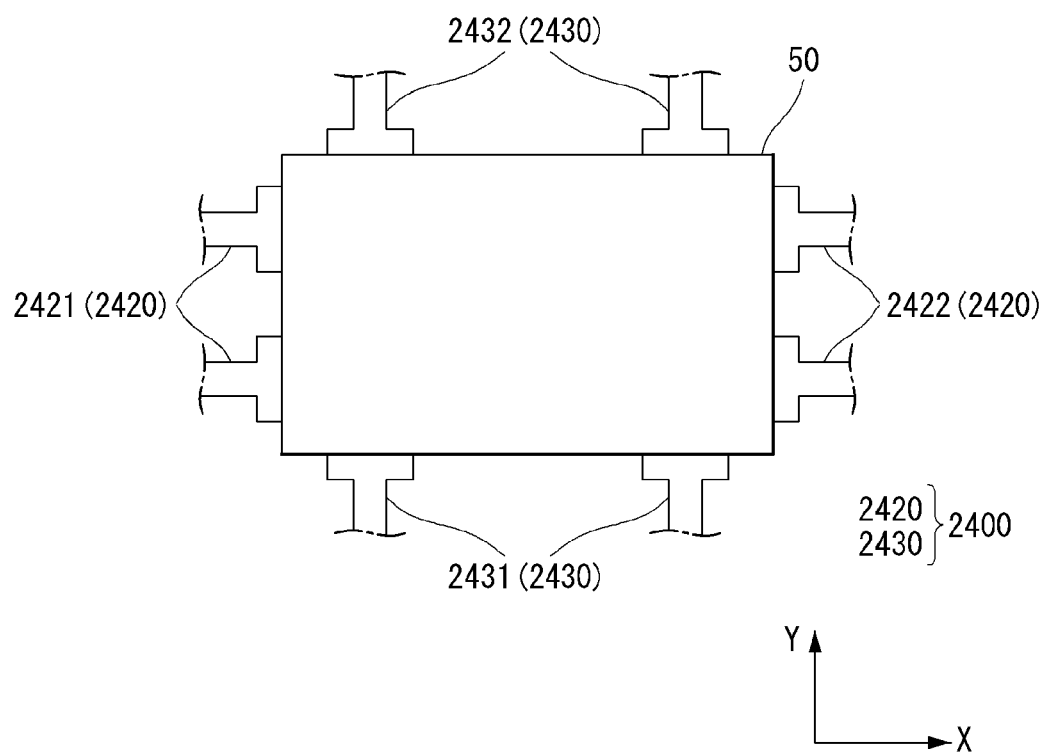
FIG. 12 illustrates that a fixing unit according to an embodiment of the present disclosure fixes a battery module along a longitudinal direction and a transverse direction.

FIG. 12 illustrates that the fixing unit 2400 according to an embodiment of the present disclosure fixes the battery module 50 along the longitudinal direction (X) and the transverse direction (Y). In FIG. 12, the fixing unit 2400 when viewed from above may be observed.

Figure 13:
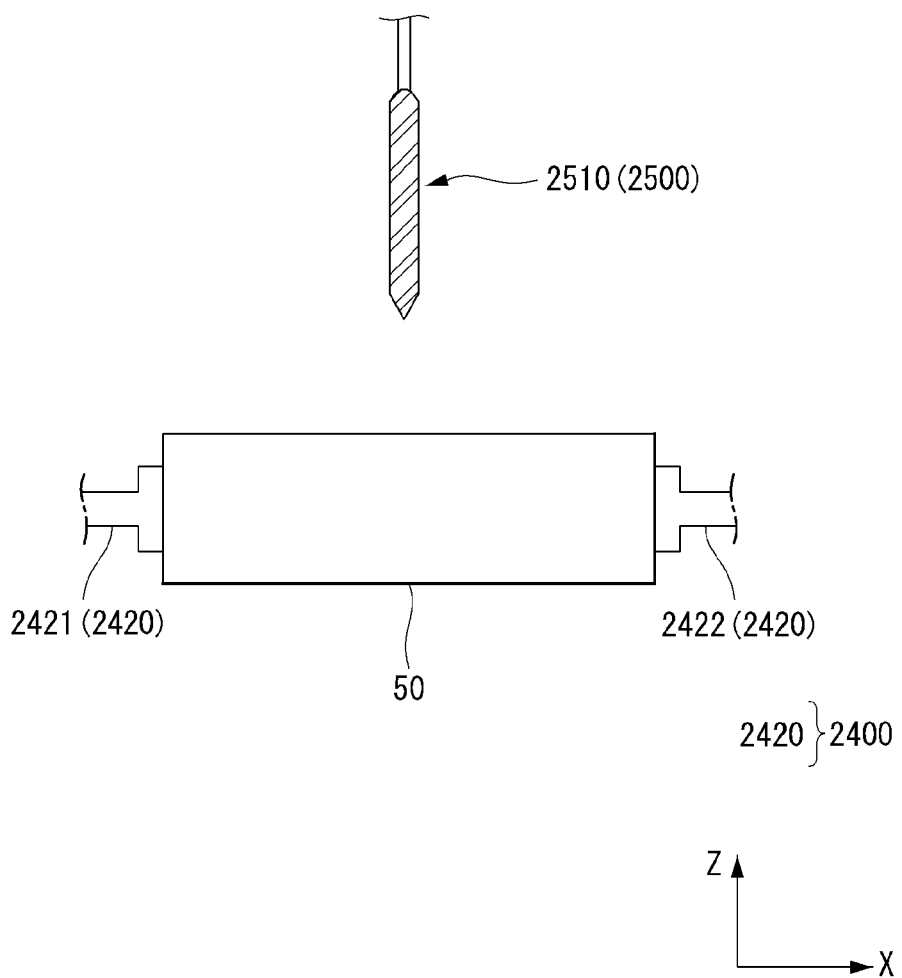
FIG. 13 illustrates that a perforation device according to an embodiment of the present disclosure perforates a battery module in a vertical direction.

FIG. 13 illustrates that the perforation device 2000 according to an embodiment of the present disclosure perforates the battery module 50 in the vertical direction (Z). In FIG. 13, the fixing unit 2400 and the perforation unit 2500 when viewed from the transverse direction may be observed.

Referring to FIGS. 12 and 13, the longitudinal fixing module 2420 and the transverse fixing module 2430 may fix the battery module 50. The perforation unit 2500 may include a vertical perforation module 2510. The vertical perforation module 2510 may move toward the battery module 50 from above the battery module 50. The vertical perforation module 2510 may move toward between adjacent second conveying rollers 2220 (see FIG. 7) among the plurality of second conveying rollers 2220 (see FIG. 7). The vertical perforation module 2510 may perforate the battery module 50.

For another example, the vertical fixing module 2410 may fix the battery module 50. For example, the plurality of vertical fixing modules 2410 may be provided. The plurality of vertical fixing modules 2410 may be disposed to be spaced apart from each other in the longitudinal direction (X) or/and the transverse direction (Y). The vertical perforation module 2510 may be disposed between the plurality of vertical fixing modules 2410.

Referring to FIGS. 1 to 13, the alignment unit 1300 may align the battery module 50 loaded on the first conveying unit 1200. The aligned battery module 50 may be loaded on the second conveying unit 2200.

The identification unit 2300 may obtain appearance information of the battery module 50. Alternatively, the identification unit 2300 may obtain information about the battery module 50 from the battery tag 52. The control unit 3000 may obtain the fifth signal S5 from the identification unit 2300. The fifth signal S5 may include an image or information about the battery module 50. The sensor unit 2800 may generate the sixth signal S6 including information about the position and/or attitude of the battery module 50 loaded on the second conveying unit 2200.

The control unit 3000 may determine, based on the input signals S1, S2, S5 and S6, at which position the battery module 50 loaded on the second conveying unit 2200 is to be perforated. That is, the control unit 3000 may generate the fourth signal S4 based on the input signals S1, S2, S5 and S6.

The second conveying unit 2200 may adjust the position of the battery module 50 in response to the fourth signal S4. The fixing unit 2400 may fix the battery module 50 in response to the fourth signal S4. The perforation unit 2500 may move toward a specific point of the battery module 50 in response to the fourth signal S4 and perforate the battery module 50.

The control unit 3000 may be a separate and independent unit from the guide device 1000 and the perforation device 2000. For another example, at least a portion of the control unit 3000 may be included in the guide device 1000. For another example, at least a portion of the control unit 3000 may be included in the perforation device 2000.

For example, the perforation device 2000 may be operated independently without the guide device 1000. In this case, the perforation device 2000 may include at least one of the control unit 3000, the input unit 4000, and the communication unit 5000. For example, the input signals S5 and S6 may include at least one of the fifth signal S5 and the sixth signal S6. The control unit 3000 may generate the fourth signal S4 based on the input signals S5 and S6. The fourth signal S4 may be provided to at least one of the second conveying unit 2200, the fixing unit 2400, the perforation unit 2500, the fire extinguishing unit 2600, and the exhaust unit 2700 and control them.

The perforation unit 2500 that moves toward the battery module 50 and is inserted into the battery module 50 may be separated from the battery module 50 while retreating. In the process of separating the perforation unit 2500, the fixing unit 2400 may suppress the movement of the battery module 50 so as to prevent the battery module 50 from being dragged by the perforation unit 2500.

For example, referring to FIG. 9, in a process where the transverse perforation module 2530 is inserted into the battery module 50 and then is separated from the battery module 50 by retreating, the first transverse fixing module 2431 may suppress the transverse direction (Y) movement of the battery module 50 while contacting the battery module 50.

For example, referring to FIG. 11, in a process where the longitudinal perforation module 2520 is inserted into the battery module 50 and then is separated from the battery module 50 by retreating, the second longitudinal fixing module 2422 may suppress the longitudinal direction (X) movement of the battery module 50 while contacting the battery module 50. For example, the vertical fixing module 2410 may include a pair of vertical fixing modules 2410 that are spaced apart from each other. The vertical perforation module 2510 may move toward the pair of vertical fixing modules 2410 and perforate the battery module 50.

For example, referring to FIG. 13, in a process where the vertical perforation module 2510 is inserted into the battery module 50 and then is separated from the battery module 50 by retreating, the vertical fixing module 2410 may suppress the vertical direction (Z) movement of the battery module 50 while contacting the battery module 50.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A perforation device perforating a battery module, the perforation device comprising:
   a loading unit, configured to convey and load the battery module in a longitudinal direction and including a pair of loading frames and a plurality of loading bar coupled between the pair of the loading frames;
   a fixing unit configured to fix by downward pressure or by longitudinal pressure to the battery module; and
   a perforation unit configured to approach the battery module in the longitudinal direction or a transverse direction and perforate the battery module,
   wherein when the perforation unit approaches the battery module in the longitudinal direction or a transverse direction, the fixing unit contacts the battery module on an opposite side of the perforation unit with respect to the battery module and suppresses movement of the battery module.

2. A perforation device perforating a battery module, the perforation device comprising:
   a loading unit configured to convey and load the battery module in a longitudinal direction;
   a fixing unit configured to fix the battery module; and
   a perforation unit configured to approach the battery module and perforate the battery module,
   wherein when the perforation unit approaches the battery module, the fixing unit contacts the battery module on an opposite side of the perforation unit with respect to the battery module and suppresses movement of the battery module,
   wherein the perforation unit includes at least one of:
   a longitudinal perforation module configured to approach the battery module in the longitudinal direction and perforate the battery module; and
   a transverse perforation module configured to approach the battery module in a transverse direction and perforate the battery module.

3. The perforation device claim 2, wherein the fixing unit includes at least one of:
   a longitudinal fixing module configured to approach and contact the battery module in the longitudinal direction and suppress a longitudinal movement of the battery module; and
   a transverse fixing module configured to approach and contact the battery module in the transverse direction and suppress a transverse movement of the battery module.

4. The perforation device claim 3, wherein the longitudinal fixing module includes a first longitudinal fixing module and a second longitudinal fixing module that are disposed in the longitudinal direction with the battery module interposed therebetween and approach and contact the battery module, and
   wherein the transverse fixing module includes a first transverse fixing module and a second transverse fixing module that are disposed in the transverse direction with the battery module interposed therebetween and approach and contact the battery module.

5. The perforation device claim 3, wherein the longitudinal fixing module includes a pair of first longitudinal fixing modules that are positioned opposite the longitudinal perforation module with respect to the battery module and are spaced apart from each other, and
   wherein the longitudinal perforation module moves toward between the pair of first longitudinal fixing modules and perforates the battery module.

6. The perforation device claim 3, wherein the transverse fixing module includes a pair of first transverse fixing modules that are positioned opposite the transverse perforation module with respect to the battery module and are spaced apart from each other, and
   wherein the transverse perforation module moves toward between the pair of first transverse fixing modules and perforates the battery module.

7. The perforation device claim 1, wherein the perforation unit includes a vertical perforation module configured to approach the battery module from above the battery module and perforate the battery module.

8. The perforation device claim 7, wherein the loading unit includes:
   a pair of guide frames having a shape extending in the longitudinal direction, the pair of guide frames being spaced apart from each other; and
   a plurality of loading bars coupled between the pair of guide frames,
   wherein the vertical perforation module moves toward between two adjacent loading bars among the plurality of loading bars and perforates the battery module.

9. The perforation device claim 1, further comprising:
   an identification unit configured to obtain an image of the battery module; and
   a control unit configured to control the fixing unit and the perforation unit based on the image.

10. The perforation device claim 9, further comprising a sensor unit configured to detect at least one of a position and an attitude of the battery module,
   wherein an input signal includes at least one of a signal detected by the sensor unit and the image, and
   wherein the control unit controls at least one of the loading unit, the fixing unit, and the perforation unit, based on the input signal.

11. A perforation system, comprising:
   a guide device configured to convey and align a battery module; and
   a perforation device configured to perforate the battery module,
   wherein the guide device includes:
   a guide frame;
   a first conveying unit installed in the guide frame, the first conveying unit being configured to convey the battery module and provide the battery module to the perforation device; and
   an alignment unit configured to align the battery module,
   wherein the perforation device includes:
   a loading unit configured to convey and load the battery module in a longitudinal direction;
   a fixing unit configured to fix the battery module; and
   a perforation unit configured to approach the battery module and perforate the battery module.

12. The perforation system claim 11, wherein the alignment unit includes:
   a first link rotatably coupled to the guide frame; and
   a second link coupled to the first link.

13. The perforation system claim 12, wherein the first link includes:
   a first link body having a shape that extends from one end and leads to another end;
   a first link pivot part formed at the one end of the first link body and rotatably coupled to the guide frame; and
   a first link connection part formed at the other end of the first link body and coupled to the second link.

14. The perforation system claim 13, wherein the first link forms a torque about the first link pivot part with respect to the guide frame.

15. The perforation system claim 14, wherein the first link applies the torque to the battery module conveyed by the first conveying unit and moves the battery module along the first link body.

16. The perforation system claim 15, wherein the second link includes:
   a second link body having a shape that extends from one end and leads to another end; and
   a second link connection part formed at the one end of the second link body and rotatably coupled to the first link connection part.

17. The perforation system claim 16, wherein when the battery module moves along the first link body, the second link body contacts the battery module.

18. The perforation system claim 11, wherein when the perforation unit approaches the battery module, the fixing unit contacts the battery module on an opposite side of the perforation unit with respect to the battery module and suppresses a movement of the battery module.

19. The perforation system claim 18, wherein the perforation unit includes at least one of:
   a longitudinal perforation module configured to approach the battery module in the longitudinal direction and perforate the battery module; and
   a transverse perforation module configured to approach the battery module in a transverse direction and perforate the battery module.

20. The perforation system claim 19, wherein the fixing unit includes at least one of:
   a longitudinal fixing module configured to approach and contact the battery module in the longitudinal direction and suppress a longitudinal movement of the battery module; and
   a transverse fixing module configured to approach and contact the battery module in the transverse direction and suppress a transverse movement of the battery module.

* * * * *